United States Patent [19]

Sears, Jr.

[11] 3,922,393

[45] Nov. 25, 1975

[54] PROCESS FOR POLISHING SILICON AND GERMANIUM SEMICONDUCTOR MATERIALS

[75] Inventor: George Wallace Sears, Jr., Wilmington, Del.

[73] Assignee: E. I. Du Pont de Nemours & Company, Wilmington, Del.

[22] Filed: July 2, 1974

[21] Appl. No.: 485,270

[52] U.S. Cl. ............... 427/215; 252/313 S; 51/281; 51/308
[51] Int. Cl.² ........................ B05D 7/00; B05D 7/24
[58] Field of Search ............ 117/213, 100 B, 100 S; 252/313 S; 51/281, 308; 427/215

[56] References Cited
UNITED STATES PATENTS

| | | | |
|---|---|---|---|
| 2,892,797 | 6/1959 | Alexander et al. | 252/313 S |
| 3,170,273 | 2/1965 | Walsh et al. | 51/281 |
| 3,328,141 | 6/1967 | Lachapelle | 51/308 |
| 3,429,080 | 2/1969 | Lachapelle | 51/309 |
| 3,527,028 | 9/1970 | Oswald | 51/281 R |
| 3,620,978 | 11/1971 | Moore, Jr. | 117/100 S |
| 3,715,842 | 2/1973 | Tredinnick et al. | 51/281 R |
| 3,745,126 | 7/1973 | Moore, Sr. | 117/100 S |

*Primary Examiner*—Mayer Weinblatt

[57] ABSTRACT

There is provided a process for polishing monocrystalline semiconductor materials of silicon and germanium to a high degree of surface perfection comprising polishing the material with a modified colloidal silica sol having a pH between about 11 to 12.5 and composed of colloidal silica particles which are coated with chemically combined atoms of aluminum to give a surface coverage of about 1 to about 50 aluminum atoms on the surface per 100 silicon atoms on the surface of uncoated particles. The particles of the modified silica sol used in the process of the invention have a specific surface area of about 25 to about 600 square meters per gram with the silica concentration of the sol ranging from about 2 to about 50% by weight.

8 Claims, No Drawings

PROCESS FOR POLISHING SILICON AND GERMANIUM SEMICONDUCTOR MATERIALS

BACKGROUND OF THE INVENTION

This invention relates to a process for polishing semiconductor materials of monocrystalline silicon and germanium.

In the manufacture of silicon and germanium semiconductor devices a highly polished mirror-like finish on the surface of the silicon or germanium supporting crystal is important in achieving a high quality product. Many polishes, chemical etches and combinations thereof have been used in an effort to achieve the requisite surface perfection.

U.S. Pat. No. 3,170,273 to Walsh and Herzog, issued on Feb. 23, 1965, discloses the use of silica sols having silica concentrations from 2 to 50% and silica gels having silica concentrations from 2 to 100% by weight for polishing silicon and germanium crystals; semiconductors of the III–V series comprising phosphides, arsenides, and antimonides of gallium and indium; and a variety of other semiconductor materials to a high degree of smoothness. The ultimate particle size of the sols and gels are disclosed to range from 5 to 200 millimicrons.

U.S. Pat. No. 3,328,141 to Lachapelle, issued on June 27, 1967, discloses a process for rapidly polishing crystalline silicon comprising polishing with a composition consisting essentially of a polishing agent for silicon and an alkaline compound in an amount to ensure a pH of at least about 10 in the presence of water employed as a suspending agent in the polishing compositions. Optimum polishing rates and surface characteristics are said to be obtained at pH values within the range of about 10.5 to about 12.5. Silicon dioxide is disclosd as a suitable polishing agent and sodium hydroxide is said to be a suitable alkaline compound.

U.S. Pat. No. 3,429,089 to Lachapelle, issued on Feb. 25, 1969, discloses that the speed of polishing crystalline silicon and germanium is greatly increased if the polishing is carried out with an aqueous slurry of a polishing agent in the presence of an oxidizing compound. Suitable polishing agents include zirconium oxide, cerium oxide, aluminum oxide, silicon dioxide and ferric oxide.

With silica powder and colloidal silica sols the rate of polishing increases with increasing pH, but at pH values over 10.5 to 11.0 the silica depolymerizes to alkali silicate with a reduction in pH. Hence, there is a need for a process of polishing semiconductor materials with colloidal silica sols at pH values of 11.0 and above.

SUMMARY OF THE INVENTION

It has been discovered that by using certain modified colloidal silica sols silicon and germanium semi-conductor materials can be rapidly polished at a pH of 11 or above to obtain highly polished surfaces with little or no depolymerization of the colloidal silica.

Specifically, it has been discovered that silicon and germanium semiconductor materials can be polished to a high degree of surface perfection by a process comprising polishing the material with a modified colloidal silica sol having a pH between about 11 to 12.5 and having its silica particles coated with chemically combined atoms of aluminum to give a surface coverage of about 1 to about 50 aluminum atoms on the surface per 100 silicon atoms on the surface of uncoated particles. The modified colloidal silica sol used in the process of the invention has a silica concentration of about 2 to about 50% by weight with the silica particles having a specific surface area of about 25 to about 600 square meters per gram.

DETAILED DESCRIPTION OF THE INVENTION

The modified silica sols used in the process of the invention are fully described in Alexander and Iler U.S. Pat. No. 2,892,797 the disclosure of which is incorporated herein by reference.

The colloidal silica sols used in the process of the invention are composed of colloidal silica particles which are coated with chemically combined atoms of aluminum to give a surface coverage of about 1 to about 50 aluminum atoms on the surface for each 100 silicon atoms on the surface of the uncoated silica particles. A surface coverage of 5 to 40 aluminum atoms on the surface of a coated silica particle for each 100 silicon atoms on the surface of an uncoated particle is preferred with a coverage of 15 to 25 aluminum atoms being most preferred.

The amount of aluminum present in the modified colloidal silica sol can be determined by ordinary analytical techniques. The percent of silicon atoms on the surface of the uncoated colloidal silica particles can be calculated from the following relationship:

% silicon atoms = 0.08 × numerical value of the specific surface area of the silica expressed in $m^2/g$.

From this relationship, from the silicon concentration of the sol, and from the amount of aluminum present in the modified sol, the surface coverage can be calculated. For instance, if the numerical value of the surface area expressed in square meters per gram were 100 and the mole ratio of silicon to aluminum were 100 to 4, then the surface coverage would be 50%, i.e., 50% of the surface silicon atoms would have been effectively covered.

According to the aforesaid Alexander and Iler patent, any silica sol an be treated to obtain a colloidal silica sol having the surface of its particles partially or fully coated by chemically combined aluminum. In general, the silica sols to be coated for use in the process of the invention have a silica concentration of about 2 to about 50% by weight with the particles of the sol having a specific surface area of about 25 to about 600 square meters per gram, preferably, about 50 to about 300 square meters per gram, and, most preferably, about 75 to about 200 square meters per gram. Specific surface area can be determined by methods familiar in the art, such as nitrogen adsorption.

The aluminum can be added to the uncoated silica sol in alkaline solution, such as sodium, potassium or tetramethylammonium aluminate. Sodium aluminate is the preferred coating agent for making the modified sols used in the process of the invention. When using sodium aluminate, it may be necessary in some cases to deionize the silica sol before adding the aluminate solution thereto.

The storage stability of the modified sols depends in part upon the total sodium content of the sol with the total solids content and the extent of surface coverage by combined aluminum being the other limiting factors. Generally, if the modified sol is not to be used immediately but will be stored for as much as 2–3 months prior to use, the maximum sodium concentration for modified sols having a specific surface area, S, is given by the empirical formula $S = 1490 N - 344,$ where $N$ is the moles of sodium ions per liter of sol and $S$ is expressed in square meters of particle surface per milliliter of sol.

The aluminate solution can have any concentration; however, if the solutions are quite concentrated, the addition to the sol without causing a local, undesirably high concentration of the metal ion in the sol is made mechanically difficult. Highly diluted solutions will ordinarily be avoided to prevent undue dilution of the product. Solutions containing 7–22% by weight of the aluminate treating agent are preferred.

The surface reaction of the aluminate with the particles of the silica sol is effected according to the methods outlined in the Alexander and Iler patent. The reaction can be effected by mixing in any of the ways known in the art for accomplishing intimate and immediate admixture without allowing local concentrations. Suitable mixing includes that obtained with a centrifugal pump, turbine pump or a Waring blender.

The amount of the aluminate treating agent added to a sol must be carefully controlled. Enough aluminate should be used to accomplish a desired treatment. Too much should not be used or else the sol will then contain the aluminate as an impurity or it may even form a precipitate in the system.

The surface reaction can be effected at ambient temperature, however, modified sols heated to about 85° to 100°C. for about 30 minutes to about 2 hours exhibit greater stability than do unheated ones. Modified sols in which the surface reaction was effected at ambient temperatures possess sufficient stability for purpose of the process of the invention.

As prepared the modified silica sols used in the process of the invention have a pH range of about 11 to 12.5 and preferably a pH range of about 11.8 to 12.3. Generally, the pH of the sols will slowly drift during storage with the loss of 0.2–0.5 pH unit over several weeks; but the sols can be alkalized to pH of 12 to 12.5 again with retention of stability and effectiveness of polishing. Specific surface areas of the modified sols will vary over the same range of values as do the starting, unmodified sols with about 75 to 200 square meters per gram being most preferred.

As mentioned hereinabove the modified silica sols used in the process of the invention can have a silica concentration of about 2 to about 50% by weight. At low silica concentrations longer polishing times will be required, whereas at silica concentrations of 40–50% precautions are necessary to prevent evaporation of water therefrom during use which would result in gelling of the sol on the polishing surface. Those of ordinary skill in the art are quite familiar with the precautions necessary for this purpose. The preferred range of silica concentration in the modified sols for use in the process of the invention is about 5 to 30% by weight.

In general, in polishing operations the colloidal silica sol is stored in a feed tank of a polishing machine. The sol is allowed to drop onto a polishing disc at a rate sufficient for polishing. Ordinary silica sols presently used for polishing will undergo a pH drift of a lower pH value while stored in the feed tank during the course of polishing. The decreasing pH will result in decreasing polishing rates. However, the modified colloidal silica sols used in the process of the invention are stable at pH values of 11 to 12.5 throughout the duration of normal polishing periods and hence yield rapid polishing rates or higher rates of removal of surface material when employed in polishing silicon and germanium semiconductors.

In the process of the invention the final polishing of silicon or germanium semiconductor materials is accomplished at a pH of about 11 to 12.5 by using the modified colloidal silica sols as described hereinabove. In making semiconductor materials from silicon and germanium a monocrystalline bar of the material is cut into wafers with a diamond-tipped saw. Preliminary polishing of the semiconductor wafer can be accomplished in any of the variety of ways which are well known in the art. For instance, initial polishing can be done with a coarse abrasive, such as 2–20 micron alumina or garnet. Subsequent polishing can be accomplished by a considerable variation of materials, polishing steps with or without etching, and length of time. These preliminary steps are advisable only insofar as they reduce the total amount of polishing time required. The surface of the wafer could be polished to a high degree from an initially rough surface with the modified colloidal silica sols described hereinabove if a sufficient duration of time is spent. Suitable polishing equipment includes the so-called commercial bowl-feed polisher as well as other commercially used or modified polishing or lapping machines.

When the final polishing of the silicon or germanium wafer is accomplished according to the process of the invention the pressure and speed of the polishing wheels and the polishing time can vary over a wide range of values. In general, the polishing time will be that necessary to obtain a high degree of surface perfection and the pressure and speed will be such as to avoid detrimental effects to the semiconductor material. The process of the invention is especially suitable for the polishing of silicon semiconductor materials and it is preferred to use the process for such.

Although the process of the invention is not limited by any theory of operation, the final polishing of silicon or germanium semi-conductors with colloidal silica sols is thought to include a predominant chemical effect and a minor mechanical effect. For instance, with silicon semiconductors, the chemical effect is believed to involve oxidation of the silicon on the surface of the semiconductor to silicate. The rate of oxidation increases with increasing pH of the sol with pH values of 11.5–12.5 appearing to be most effective for polishing. It is thought that colloidal silica acts both as a mechanical abrasive and as a scavenger for silicate. In this latter capacity, the colloidal silica is believed to reduce deposition of silicate on the silicon surface in the form of a "haze." Ordinary colloidal silica and fine silica powders depolymerize to silicate at a pH of 12 thereby decreasing the pH to about 11 and increasing the silicate concentration of the polishing agent.

The beneficial effect of the process of the invention is severalfold — the high pH results in high polishing rates and the greater stability of the modified colloidal silica sols results in high degree of scavenging and low haze.

When polishing with ordinary colloidal silica sols which have been adjusted to a pH of 12, the rates of removal of surface material from the semiconductor seldom exceed 0.05 millimeter per hour because of the difficulties previously described.

The process of the invention is illustrated but is not intended to be limited by the following examples.

EXAMPLE 1

To a 580 liter stainless steel tank were charged 404 kilograms of a silica sol containing 52.4% $SiO_2$ by weight, the silica particles of which had a specific surface area of 132 square meters per gram. The sol was stabilized with sodium hydroxide until the weight ratio of $SiO_2:Na_2O$ was 230. The sol was then diluted with 171 kilograms of water. A turbine mixer with a rotor having a diameter of 5.1 centimeters and capable of operating at 10,000 rpm was installed with the rotor immersed several centimeters below the surface of the liquid and adjusted so as to force liquid upward through the rotor housing and against a baffle plate also positioned below the surface of the liquid. A delivery tube for the introduction of a solution of sodium aluminate was installed with its exit end immediately below the turbine housing so as to provide almost instantaneous mixing of the sodium aluminate with the colloidal silica. A sodium aluminate solution was prepared by dissolving 8.3 kilograms technical sodium aluminate, which is sold by the Reynolds Aluminum Co. and contains 72% $NaAlO_2$ by weight, in 33.2 kilograms water. This solution was then pumped through the delivery tube at about 0.125 liters per second while operating the turbine mixer at full speed. The resulting product was a stable sol having a pH of 11.7, containing 35% solids, the silica particles of which were coated to an extent of 19.5% with aluminate ions.

Silicon wafers 7.5 centimeters in diameter were initially polished with alumina having a particle size of 10–15 microns and thereafter with diamond paste and a lubricant using a soft felt polishing pad and standard polishing equipment having 4 platens for mounting the wafers. The wafers were cleaned and then polished with the above-described modified sol which was previously diluted with a NaOH solution to a pH of 12 and a solids content of 10–12% by weight. The polishing platen was operated at a rotational speed of 150 rpm and the wafer-mounted platens were run at a speed of 50 rpm with a pressure of 450 grams per square centimeter being exerted on the surface of the wafers. The polishing was conducted at a surface temperature of 60°C. with the modified silica sol being applied to the wafers by allowing the sol to drop onto the polishing pad at a flow rate of 95 milliliters per minute. On the average a polishing or removal rate per wafer of 150 microns per hour was achieved whereas removal rate per wafer of only 50 microns per hour was achieved with an unmodified colloidal silica sol using the same technique. The wafers polished with the modified sol displayed a high degree of surface perfection.

EXAMPLE 2

To a 75 liter plastic tank were charged 40 kilograms of a silica sol containing 50.8% $SiO_2$ by weight, the silica particles of which had a specific surface area of 130 square meters per gram. The sol was diluted with 21.3 kilograms of water. Using a turbine mixer and delivery tube similar to those described in Example 1, a sodium aluminate solution which was prepared by dissolving 400 grams of technical sodium aluminate in 1600 milliliters of water was introduced while operating the mixer at full speed.

The resulting product was a stable sol containing 30% solids and having its silica particles coated to an extent of 10% with aluminate. The pH of this modified sol as prepared was 12.0 but after storage for 24 hours had drifted to 11.4 and after 48 hours had drifted to 11.2. In comparison, an unmodified sol of the type from which the starting material was selected underwent a pH drift to a pH value of 11.3 in 2 hours after alkalization to a pH of 12 with dilute NaOH.

The modified sol was diluted with an equal weight of water and used to polish silicon wafers with equipment similar to that described in Example 1. The rate of removal of silicon was 75 microns per hour and polished surfaces of the wafers displayed a high degree of perfection.

EXAMPLE 3

Thirty grams of colloidal silica sol similar to that described in Example 2 were diluted with 112 grams of distilled water in a small laboratory blender. While this diluted silica sol was vigorously mixed 6.34 grams of a sodium aluminate solution having half the concentration of the aluminate solution of Example 2 was added thereto. Thereafter, the pH of the sol was raised to 12.06 by the addition of 1.90 milliliters of a 1.0 N sodium hydroxide solution. The resulting product contained 10% solids by weight with the silica particles having a 20% coverage with aluminate. After 24 hours, the pH of the sol was 12.02 and after 1 week the pH was 11.7. After 3 weeks the sol had a pH of 11.45 which is indicative of the stability of the sol against depolymerization at high pH and pH drift. Since this modified sol is relatively free of pH drift, it would provide rapid polishing rates similar to those obtained in Example 1 if used for polishing silicon and germanium semiconductor materials.

EXAMPLE 4

Thirty grams of colloidal silica sol similar to that described in Example 2 were diluted with 119 grams of water and subsequently treated with 9.52 grams of a 10% by weight solution of sodium aluminate pursuant to the procedure of Example 3. The resulting sol was further alkalized to a pH of 12.05 with 1.2 milliliters of a 1.0 N. sodium hydroxide solution. The resulting modified sol contained 10% by weight of solids with silica particles therein having an aluminate coverage of 30%. After 3 weeks the pH of the modified sol was 12.05. Since this modified sol is free of pH drift, it would give rapid polishing rates if it were used to polish silicon or germanium semiconductors.

I claim:

1. A process for polishing semiconductor material selected from the group consisting of silicon and germanium to a high degree of surface perfection comprising polishing the material with a modified colloidal silica sol having a pH between about 11 to 12.5 in which the colloidal silica particles are coated with chemically combined atoms of aluminum to give a surface coverage of about 1 to about 50 aluminum atoms on the surface per 100 silicon atoms on the surface of uncoated particles, the particles of said modified silica sol having a specific surface area of about 25 to about 600 square meters per gram and said sol having a silica concentration of about 2 to about 50% by weight.

2. The process of claim 1 wherein the surface coverage is about 5 to about 40 aluminum atoms per 100 silicon atoms and the silica concentration of the sol is about 5 to about 30% by weight.

3. The process of claim 1 wherein the semiconductor material is silicon.

4. The process of claim 2 wherein the surface coverage is about 15 to about 25 aluminum atoms per 100 silicon atoms.

5. The process of claim 4 wherein the particles of the modified silica sol have a specific surface area of about 50 to about 300 square meters per gram.

6. The process of claim 4 wherein the particles of said sol have a specific surface area of about 75 to about 200 square meters per gram.

7. The process of claim 5 wherein the semiconductor material is silicon.

8. The process of claim 6 wherein the pH is about 11.8 to 12.3.

* * * * *